Dec. 6, 1949     C. F. DE VOE     2,490,339
ELECTRIC GLASS MELTING FURNACE AND PROCESS
Filed Sept. 30, 1946

Inventor
CHARLES F. DE VOE

Knight & Fowler
Attorneys

Patented Dec. 6, 1949

2,490,339

UNITED STATES PATENT OFFICE 2,490,339

ELECTRIC GLASS MELTING FURNACE AND PROCESS

Charles F. De Voe, Corning, N. Y., assignor to Corning Glass Works, Corning, N. Y., a corporation of New York Application September 30, 1946, Serial No. 700,236

5 Claims. (Cl. 13—6)

The present invention relates to electric glass melting furnaces and is particularly concerned with the provision of an improved furnace of the type wherein glass is melted and fined by passing electric currents therethrough, supplied by carbon electrodes submerged in the melting chambers. Although carbon is one of the most suitable electrode materials known, it causes discoloration of the glass if operated at temperatures often required for melting and fining glass.

One object of the present invention is a structure of extremely simple design in which maximum temperatures are developed in areas remote from the electrodes so that the temperature of the electrodes can be kept below that at which there is danger of glass discoloration thereby.

Another object is a furnace structure wherein maximum temperatures are developed in areas remote from the outside walls of the melting chamber.

A still further object is a furnace wherein the electrode elements are arranged in close proximity to the relatively cool outside walls of the melting chamber.

Another object is a furnace wherein the electrodes are located in relatively cool areas of the melting chamber remote from the path of travel of the main body of glass therethrough so that any discoloration of glass by the electrodes will occur in relatively stagnant glass and have a minimum of adverse effect on the quality of glass produced.

Other objects and features of the invention will become apparent from a further perusal of the following description of a typical embodiment of the invention, reference being had to the accompanying diagrammatic drawing exemplifying the same and forming a part of the present disclosure.

Figure 1:
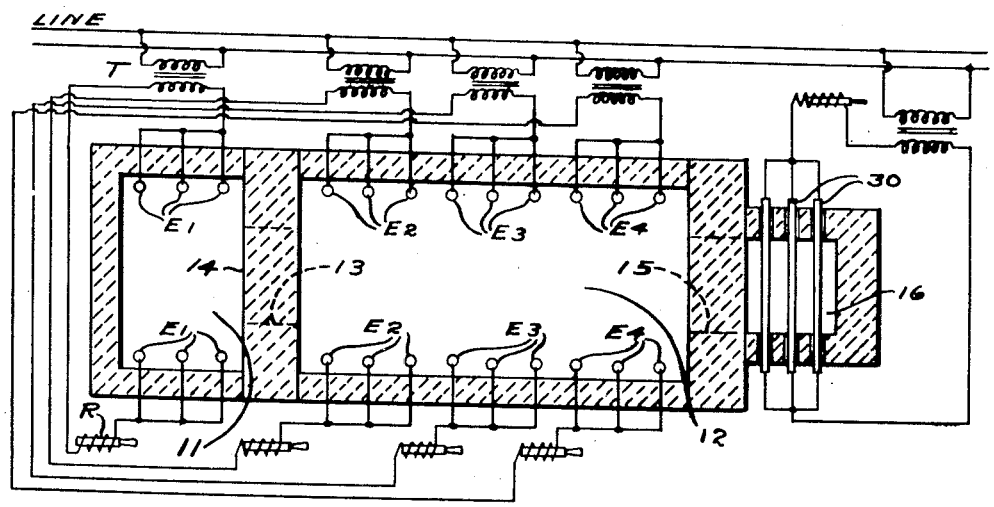
Fig. 1 is a sectional plan view of an electric glass melting furnace showing the necessary electrical connections thereto.
Figure 2:
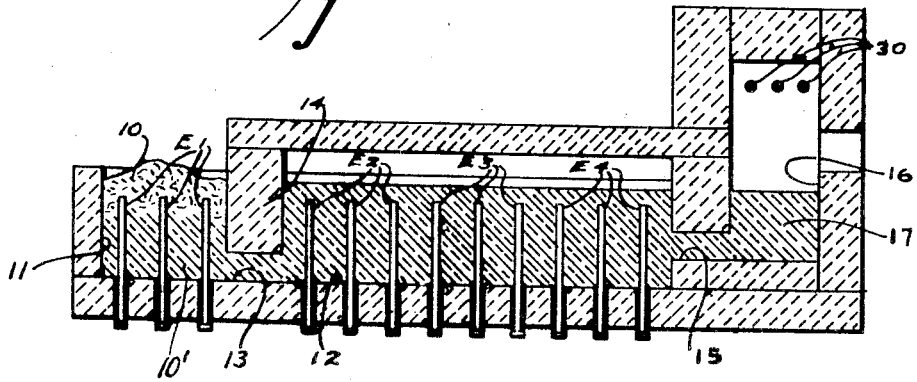
Fig. 2 is a sectional elevation of the melting furnace.

The electric furnace shown comprises an oblong premelting chamber 11, connected to a combined melting and fining chamber or zone 12 of oblong configuration by a submerged throat 13 in one of its side walls 14 forming an end wall of the combined melting and fining chamber. Chamber 12 is in turn connected by a submerged throat 15 to a relatively small working chamber 16 from which glass 17 may be gathered or fed to glass working equipment in any desired manner. Obviously, if desired, the walls through which throats 13 and 15 pass may be of conventional bridgewall design.

Batch materials 10 in the pre-melting chamber 11 are liquefied by the Joule effect by applying suitable electric potentials to electrodes each composed of a number of rod-like elements E1 arranged in rows alongside the end or short-length walls of the pre-melting chamber 11 and submerged in a pool 10' of previously melted glass.

The heating of liquefied batch materials in the entry or melting end of chamber 12 is accomplished by applying suitable potentials to the rod-like electrode elements E2 of the groups of elements E2—E4 arranged in rows alongside the side or long-length walls of chamber 12. As illustrated, preferably, elements E1—E4 are extended into the respective chambers through the bottoms thereof and connections made thereto by suitable water cooled clamps not shown.

Heat is directed into the glass 17 in the working chamber 16 by means of a bank of resistor elements 30 arranged above the glass.

Heating potential is applied to the electrode elements E1 from the secondary of a transformer T in circuit with a controlling reactor R and to the other electrode elements in like manner, as indicated.

Operation

In operating the furnace a pile of batch 10 is maintained in the pre-melting chamber 11 substantially covering the pool therein so that the upper portion of the batch pile serves to insulate the pool against excessive heat loss. A current flow is maintained in the pool 10' below batch 10 between electrode elements E1 as required to quickly convert the lower portion of the pile into a molten mass enabling it to flow through throat 13 into chamber 12 as glass in the delivery end of chamber 12 passes through throat 15 into the working chamber 16 to replace glass removed therefrom.

The molten mass of batch entering chamber 12 is at least as hot as the batch material occupying the area between electrode elements E2 and accordingly does not upset temperature conditions therein as would be the case were fresh cold batch directly introduced into chamber 12. The liquefied batch material accordingly merely becomes diffused and intermixed with the surrounding liquid which has convectional currents therein between the groups of elements E2. In this connection, attention is directed to the fact that electrodes E2 are near the sidewalls through which, as is generally known, there is material heat loss in addition to heat loss through the furnace bottom and particularly around the water-cooled electrodes. Since the temperature of the liquid entering chamber 12 is substantially the same as that already in the entry end thereof, electrodes E2 need supply only the necessary current to replace the heat lost through the side and bottom walls in the entry section of chamber 12. Glass encountering the sidewalls is cooled and moves downward and inward and upward through the center of the space between the electrodes E2 and thence outward toward such electrodes and accordingly transverse chamber 12. The glass in the center and in the fining end of chamber 12 is of course also moving transverse the chamber between the groups of electrode elements E3 and between the groups of electrode elements E4 respectively.

Preferably, the potentials applied to the groups of elements E4 are such that the current density in the fining end of chamber 12 is of a value sufficient to maintain the temperature of glass higher than that maintained in the entrance end of the chamber and, accordingly, in addition to the convectional currents tranverse of chamber 12 between the groups of elements E4, there also exist convectional currents of surface glass from the fining end of the chamber 12 back toward the lower temperature glass in the entrance end thereof, thus guarding against the forward movement of unfined glass into the fining end of the chamber. As will be understood, the current flow through resistors 30 in the working chamber 16 is adjusted to hold the glass at a desired working temperature.

Having thus described a preferred embodiment of the invention, what is considered to be new and is desired to have covered by letters patent is hereinafter pointed out in the appended claims.

I claim:

1. In a glass-melting tank, a first section of rectangular configuration having a top opening for the introduction of a glass batch thereinto, a second section of rectangular configuration for the melting and fining of glass, a bridgewall having a submerged throat connecting said sections, vertically disposed electrode elements in said first section, all of which are arranged along two opposite wall portions thereof bordering the top opening and arranged in rows parallel to the passage afforded by said throat, a plurality of separate groups of vertically disposed electrode elements in said second section along the opposite wall portions thereof arranged in rows parallel to the passage afforded by the throat, all of said electrode elements projecting through the bottom of said tank, and means for separately supplying heating potentials to the electrode elements in said first section and the separate groups of electrode elements in said second section.

2. A glass-melting tank as defined by claim 1 wherein the means for separately supplying heating potentials to the electrode element groups include the secondaries of transformers and potential-regulating reactors respectively.

3. A glass-melting tank as defined by claim 1 wherein a third section for the working of the fined glass adjoins the second section and is separated therefrom by a bridgewall having a submerged throat, said third section having separate heating means therein.

4. The method of electrically melting and fining glass, which includes the steps of introducing raw glass batch materials into a pool of liquefied glass batch materials as required to substantially cover and insulate such pool against excessive heat loss, passing a current through the pool of liquefied glass batch materials to heat and progressively liquefy the raw glass batch materials as they become submerged in the pool, introducing liquefied glass batch materials from said pool into the melting end of a combined melting and fining zone, passing current through such liquefied glass batch materials during their passage through said zone to progressively effect melting thereof into liquid glass and fining of the resulting liquid glass, withdrawing fined glass from the lower portion of the fining end of said zone, and varying the density of the current flow in said zone to tend to create a convection flow of surface glass along the surface of the liquid glass away from the point of withdrawal of fined glass toward the point of introduction of liquefied glass batch materials.

5. The method of electrically melting and fining glass as claimed in claim 4, wherein the current densities in the pool and zone are so regulated that the liquefied glass batch materials are introduced into the melting and fining zone at a temperature at least as high as that maintained in such zone at the point of introduction of said liquefied materials thereinto.

CHARLES F. DE VOE.

REFERENCES CITED

The following references are of record in the file of this patent:

UNITED STATES PATENTS

| Number | Name | Date |
|---|---|---|
| 1,062,362 | Sauvageon | May 20, 1913 |
| 1,552,555 | Gravel | Sept. 8, 1925 |
| 1,593,054 | Arbeit | July 20, 1926 |
| 1,597,073 | Keenan | Aug. 24, 1926 |
| 1,880,541 | Wadman | Oct. 4, 1932 |
| 1,897,973 | Wadman | Feb. 14, 1933 |
| 2,122,469 | Hitner | July 5, 1938 |
| 2,225,616 | Borel | Dec. 24, 1940 |
| 2,267,537 | Romazzotti | Dec. 23, 1941 |
| 2,350,734 | Dumarest | June 6, 1944 |
| 2,397,852 | Gentil | Apr. 2, 1946 |

FOREIGN PATENTS

| Number | Country | Date |
|---|---|---|
| 350,474 | Great Britain | June 8, 1931 |